United States Patent [19]

Moyer

[11] Patent Number: 4,823,923
[45] Date of Patent: Apr. 25, 1989

[54] ENERGY DAMPENING APPARATUS

[76] Inventor: James E. Moyer, 403 Marquis St., Staunton, Va. 24401

[21] Appl. No.: 240,265

[22] Filed: Sep. 6, 1988

[51] Int. Cl.⁴ .......................... F16F 7/12; B60R 19/34; B60R 19/26
[52] U.S. Cl. ..................................... 188/376; 188/375; 293/132; 293/133
[58] Field of Search ............... 188/371, 374, 375, 376; 293/107, 133, 134, 132

[56] References Cited

U.S. PATENT DOCUMENTS

| | | | |
|---|---|---|---|
| 2,837,176 | 6/1958 | Dropkin | 188/375 |
| 3,399,919 | 9/1968 | Brunt | 293/134 |
| 3,782,505 | 1/1974 | Armstrong | 188/375 |
| 3,847,426 | 11/1974 | McGettigan | 293/133 |
| 3,960,397 | 6/1976 | Janoi . | |
| 3,961,818 | 6/1976 | Roth, Jr. . | |
| 4,031,978 | 6/1977 | Taylor | 293/133 X |
| 4,257,581 | 3/1981 | Keeler, II . | |
| 4,366,976 | 1/1983 | Granig . | |

FOREIGN PATENT DOCUMENTS

| | | | |
|---|---|---|---|
| 1142761 | 1/1963 | Fed. Rep. of Germany | 293/133 |
| 0266841 | 11/1986 | Japan | 188/371 |
| 1428767 | 3/1976 | United Kingdom | 293/134 |

Primary Examiner—Andres Kashnikow
Assistant Examiner—Richard Potosnak
Attorney, Agent, or Firm—Henderson & Sturm

[57] ABSTRACT

A simple yet reliable apparatus is disclosed for dissipating sudden impacts or applications of force. Sudden impacts are dissipated through the sequential shearing of rods or pins anchored perpendicularly to the incoming force and through the compression and evacuation of gel through holes or valves in a cylinder. By varying the diameter and length of the cylinder, pistons, the number size and composition of shear pins, the number and size of restriction holes and or the amount of gel, the system can reliably dissipate impacts within predetermined limits.

3 Claims, 1 Drawing Sheet

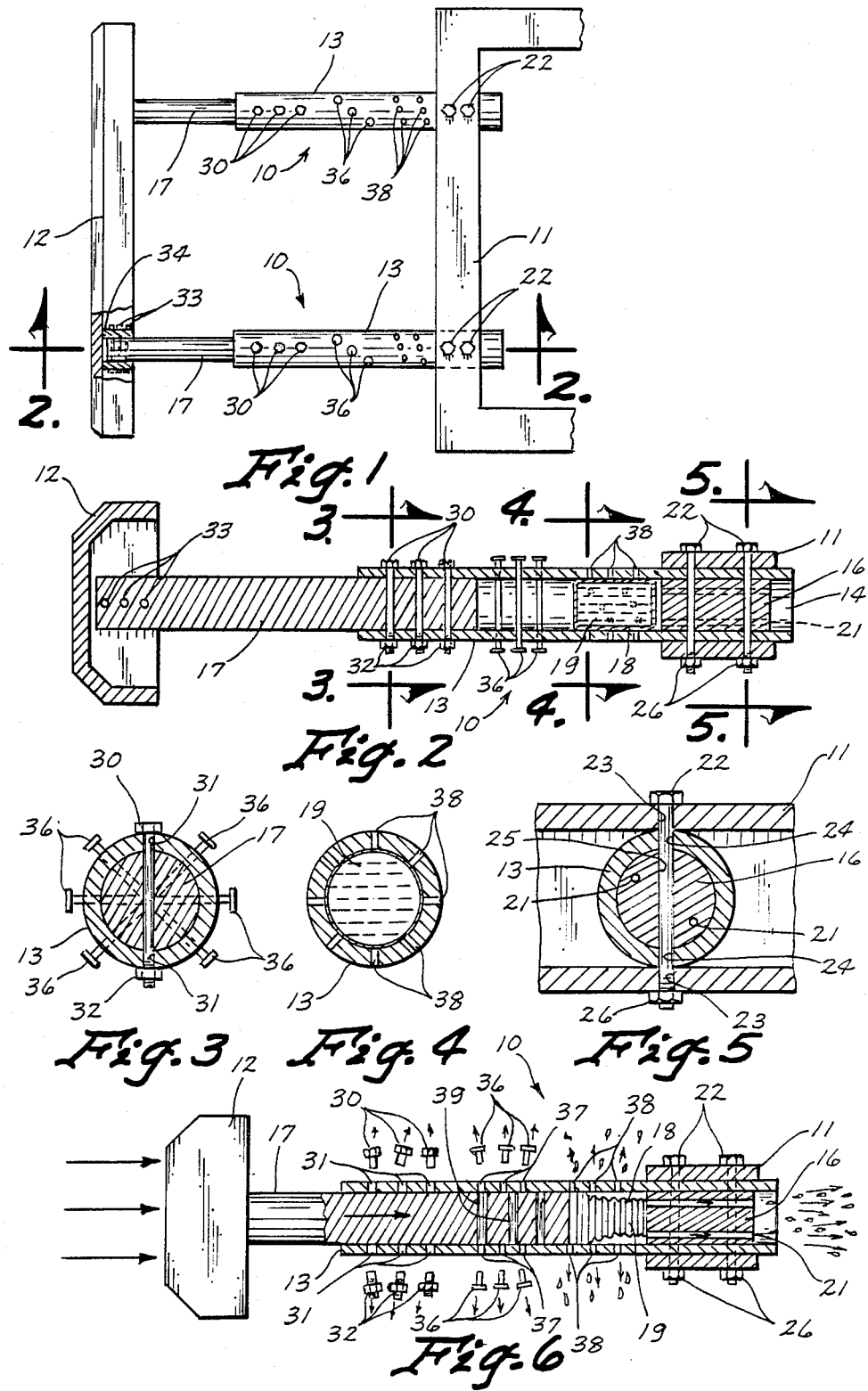

ENERGY DAMPENING APPARATUS

TECHNICAL FIELD

The present invention relates generally to an energy dampening apparatus and more particularly to such an apparatus in which sudden impacts are dissipated through the sequential shearing of rods or pins anchored perpendicularly to the incoming forces and through the compression and evacuation of gel through holes or valves in a cylinder.

BACKGROUND ART

Energy dampening devices have been known for many years. A most common usage for such energy dampening devices is in the vehicle bumpers so that the force of impact will be dissipated by such energy dampening apparatus, thereby minimizing the actual damage to the motor vehicle. For example, U.S. Pat. Nos. 3,960,397 to Janci, 3,961,818 to Roth, 4,366,876 to Granig and 4,257,581 to Keeler are representative of such devices for absorbing shock and preventing damage to a motor vehicle by connecting such energy dampening devices to the bumper thereof.

DISCLOSURE OF THE INVENTION

The present invention relates to a simple yet reliable apparatus for dissipating sudden impacts or applications of force. Sudden impacts are dissipated through the sequential shearing of rods or pins anchored perpendicularly to the incoming force and through the compression and evacuation of gel through holes or valves in a cylinder. By varying the diameter and length of the cylinder, pistons, the number, size and composition of shear pins, the number and size of restriction holes and or the amount of gel, the system can reliably dissipate impacts within predetermined limits.

An object of the present invention is to provide an improved energy dampening apparatus.

Another object of the present invention is to provide an energy dampening apparatus which is inexpensive to construct, easy to manufacture and assemble and which is reliable.

Other objects, advantages, and novel features of the present invention will become apparent from the following detailed description of the invention when considered in conjunction with the accompanying drawings.

BRIEF DESCRIPTION OF THE DRAWINGS

FIG. 1 is a top plan view of a preferred embodiment of the present invention attached to the frame of a vehicle and having a bumper attached to the other end of the energy dampening apparatus;

FIG. 2 is an enlarged cross-sectional view taken along line 2—2 of FIG. 1;

FIG. 3 is a cross-sectional view taken along line 3—3 of FIG. 2;

FIG. 4 is a cross-sectional view taken along line 4—4 of FIG. 2;

FIG. 5 is a cross-sectional view taken along line 5—5 of FIG. 2; and

FIG. 6 is a view like FIG. 2 but showing the energy dampening apparatus in the process of absorbing a sudden impact on the bumper attached thereto.

BEST MODE FOR CARRYING OUT THE INVENTION

Referring now to the drawings wherein like reference numerals designate identical or corresponding parts throughout the several views, FIG. 1 shows an energy dampening apparatus (10) attached at one end thereof to a vehicle frame (11) and at the other end thereof to a vehicle bumper (12).

A cylinder (13) has an opening (14) extending therethrough which has a constant shape and size throughout the length thereof. The cylinder (13) has a first piston (16) disposed in one end thereof and a second piston (17) disposed in the other end thereof. A sealed packet (18), for example of a plastic material, has a gel (19) therein which could be of a petroleum base or any other gel which will not freeze at normal atmospheric temperatures.

The first piston (16) may have a plurality of openings (21) extending therethrough and these openings (21) could have restrictive devices or one-way valves therein to allow the gel (19) to pass therethrough as will be discussed below.

Mounting bolts (22) extend through holes (23) in the frame (11) (FIG. 5), through holes (24) in cylinder (13) and through holes (25) in the first piston (16). A nut (26) is threadably engaged on the other end of the mounting bolts (22).

The second piston (17) has a plurality of shear pin bolts (30) which extend through holes (31) in the other end of the cylinder (13) and has a threaded nut (32) on the other end thereof. Threaded fasteners (33) extend through openings in the other end of the piston (17) and through flanges (34) of bumper (12) to connect the bumper (12) to the second piston (17). Shear pins (36) extend through openings (37) in an intermediate portion of the cylinder (13) and openings (38) are disposed in the cylinder (13) just outside the packet (18) of gel (19).

The energy dampening apparatus (10) shown in FIG. 1 in its initial position is shown in FIG. 6 in operation. For example, if the vehicle having a frame (11) is stopped and another vehicle rams into the bumper (12), then the second piston (17) will be moved to the right as shown in FIG. 6.

The first stage of energy dampening will be the force absorbed by the resistance of shear bolt pins (30). Once the force is so great to break these shear pin bolts (30), the piston (17) will continue to move to the right until it contacts and shears the shear pin (36). This will constitute the second stage of energy dampening for the apparatus (10). After the shear pins (36) have been sheared off by the forces on piston (17), the piston (17) will contact the packet (18) of gel (19), thereby rupturing the packet (18) and allowing the gel to exit through restricted openings (38) in the cylinder (13) and also through optional restricted openings (21) in the piston (16). It will of course be understood that valves or other restricters can be inside of the openings (21) if desired. This will constitute the third stage of energy dampening. If even more dampening is needed, the piston (17) will continue to the right and force the piston (16) to the right out of the cylinder (13) by shearing off the mounting bolts (22).

If the compression of the piston (17) is not too severe, the system can be reused by replacing the shear pins and the gel packet (18 and 19). If the system is too severely damaged, then it is merely discarded instead of repaired and this is quite feasible because it is inexpensively constructed.

Accordingly, it will be appreciated that the preferred embodiment disclosed herein does indeed accomplish the aforementioned objects. Obviously, many modifications and variations of the present invention are possible in light of the above teachings. It is therefore to be understood that, within the scope of the appended claims, the invention may be practiced otherwise than as specifically described.

I claim:

1. An energy dampening apparatus for attachment to a frame having at least one hole extending therethrough, said energy dampening apparatus comprising:
   an elongated cylinder having a longitudinal axis, said cylinder having a constant internal configuration along a substantial length thereof;
   a first hole extending through one end of said cylinder, a second hole extending through the other end of said cylinder and a third hole extending through said cylinder between the first and second holes therein, said first, second and third holes extending substantially transversely to the longitudinal axis of the cylinder;
   a first piston having an outer configuration substantially matching the internal configuration of said cylinder and received in said one end of the cylinder;
   at least one hole extending through said first piston transverse to the longitudinal axis of said cylinder;
   mounting bolt means extending through the hole in said first piston, through the first hole in the cylinder and through a hole in said frame for holding the cylinder in a predetermined position and tending to prevent said first piston cylinder from sliding inside of said cylinder;
   a second piston having a longitudinal axis the same as the longitudinal axis of the first cylinder, said second piston having an outer substantially constant configuration substantially matching the internal configuration of said cylinder, at least one hole extending through said second piston substantially transverse to the longitudinal axis of said second piston;
   first shear bolt means extending through the second hole in the cylinder and through the hole in said second piston for being broken when adequate forces impact said second piston;
   second shear pin means extending through said third hole in said cylinder for resisting the force of sliding movement of said second piston within said cylinder;
   a liquid gel;
   packet means for enclosing said gel within said cylinder between said first and second position; and
   port means in said cylinder adjacent to said packet means for restrictively permitting said gel to be forced out therethrough when said second piston is forced into said packet means and toward said first piston.

2. The apparatus of claim 1 including a vehicle bumper means attached to an end of said second piston for transmitting impact forces therefrom to said second piston.

3. The apparatus of claim 2 including a second energy dampening apparatus identical to the first said energy dampening apparatus, said second energy dampening apparatus having one end thereof attached to said frame and the other end thereof attached to said vehicle bumper.

* * * * *